United States Patent
Ishida et al.

(10) Patent No.: US 10,300,908 B2
(45) Date of Patent: May 28, 2019

(54) CONTROL DEVICE FOR STARTING AN INTERNAL COMBUSTION ENGINE DURING A SHIFTING OPERATION

(71) Applicant: AISIN AW CO., LTD., Anjo-shi, Aichi-ken (JP)

(72) Inventors: Shoichi Ishida, Toyoake (JP); Kohei Tsuda, Nishio (JP); Keiichirou Kusabe, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/556,228

(22) PCT Filed: Mar. 29, 2016

(86) PCT No.: PCT/JP2016/060069
§ 371 (c)(1),
(2) Date: Sep. 6, 2017

(87) PCT Pub. No.: WO2016/158928
PCT Pub. Date: Oct. 6, 2016

(65) Prior Publication Data
US 2018/0043880 A1     Feb. 15, 2018

(30) Foreign Application Priority Data
Mar. 31, 2015 (JP) ................... 2015-071966

(51) Int. Cl.
*B60W 20/30*     (2016.01)
*B60W 20/40*     (2016.01)
(Continued)

(52) U.S. Cl.
CPC ............. *B60W 20/30* (2013.01); *B60K 6/365* (2013.01); *B60K 6/48* (2013.01); *B60K 6/547* (2013.01);
(Continued)

(58) Field of Classification Search
CPC .... B60W 20/30; B60W 20/40; B60W 30/192; F02N 11/0803; Y02T 10/48; Y02T 10/6286; B60K 6/48
See application file for complete search history.

(56) References Cited

U.S. PATENT DOCUMENTS

2007/0056783 A1*   3/2007   Joe ........................ B60K 6/48
                                                              180/65.265
2007/0080005 A1    4/2007   Joe
(Continued)

FOREIGN PATENT DOCUMENTS

JP       2007-099141 A      4/2007
JP       2008013026 A  *    1/2008
(Continued)

OTHER PUBLICATIONS

JPO machine translation of JP 2010-149560 (original JP document published Jul. 8, 2010) (Year: 2010).*
(Continued)

*Primary Examiner* — Behrang Badii
*Assistant Examiner* — David A Testardi
(74) *Attorney, Agent, or Firm* — Oliff PLC

(57) ABSTRACT

A control device that includes an electronic control unit that causes a rotational speed of the rotating electric machine to change according to a predetermined first change pattern after the rotational speed of the rotating electric machine changes from a pre-shifting synchronous rotational speed in association with progress of the shifting operation until reaching a first synchronous range that is determined on the basis of a rotational speed of the internal combustion engine, the pre-shifting synchronous rotational speed being the rotational speed of the rotating electric machine in a shift speed established before the shifting operation is started.

2 Claims, 7 Drawing Sheets

(51) Int. Cl.

| | | |
|---|---|---|
| *F02N 11/08* | (2006.01) | |
| *B60K 6/48* | (2007.10) | |
| *B60K 6/547* | (2007.10) | |
| *B60W 10/02* | (2006.01) | |
| *B60W 10/08* | (2006.01) | |
| *B60W 10/06* | (2006.01) | |
| *B60W 10/11* | (2012.01) | |
| *B60W 30/192* | (2012.01) | |
| *B60K 6/365* | (2007.10) | |
| *B60W 30/19* | (2012.01) | |
| *B60L 50/16* | (2019.01) | |

(52) U.S. Cl.
 CPC ............. *B60L 50/16* (2019.02); *B60W 10/02* (2013.01); *B60W 10/06* (2013.01); *B60W 10/08* (2013.01); *B60W 10/11* (2013.01); *B60W 20/40* (2013.01); *B60W 30/19* (2013.01); *B60W 30/192* (2013.01); *F02N 11/0803* (2013.01); *B60K 2006/4825* (2013.01); *B60W 2510/0638* (2013.01); *B60W 2510/081* (2013.01); *B60W 2510/104* (2013.01); *B60W 2510/1005* (2013.01); *B60W 2510/1015* (2013.01); *Y02T 10/6221* (2013.01); *Y02T 10/6252* (2013.01); *Y02T 10/6286* (2013.01); *Y02T 10/7258* (2013.01)

(56) References Cited

U.S. PATENT DOCUMENTS

| | | | | | |
|---|---|---|---|---|---|
| 2007/0227790 | A1* | 10/2007 | Tanishima | ............... | B60K 6/48 180/65.245 |
| 2007/0259755 | A1* | 11/2007 | Tanishima | ............. | B60K 6/387 477/3 |
| 2008/0064561 | A1* | 3/2008 | Popp | ....................... | B60K 6/48 477/5 |
| 2012/0059542 | A1* | 3/2012 | Kawai | ...................... | B60K 6/48 701/22 |
| 2012/0232732 | A1* | 9/2012 | Tsuda | ...................... | B60K 6/48 701/22 |
| 2013/0124027 | A1* | 5/2013 | Tanishima | ............... | B60K 6/48 701/22 |
| 2013/0218389 | A1* | 8/2013 | Tanishima | ............... | B60K 6/48 701/22 |
| 2013/0297128 | A1* | 11/2013 | Takamura | ................ | B60K 6/48 701/22 |
| 2013/0297136 | A1* | 11/2013 | Yamanaka | ............... | B60K 6/48 701/22 |
| 2014/0018207 | A1* | 1/2014 | Kobayashi | ............... | B60K 6/48 477/5 |
| 2014/0163793 | A1* | 6/2014 | Kim | ....................... | B60W 20/10 701/22 |
| 2014/0207323 | A1* | 7/2014 | Yoshida | ................... | B60K 6/48 701/22 |
| 2014/0222270 | A1* | 8/2014 | Tsutsumi | .............. | B60W 20/40 701/22 |
| 2014/0343771 | A1* | 11/2014 | Kim | ....................... | B60W 10/02 701/22 |
| 2015/0051767 | A1* | 2/2015 | Mohri | ................... | B60L 11/005 701/22 |

FOREIGN PATENT DOCUMENTS

| | | | | | |
|---|---|---|---|---|---|
| JP | 2008-207643 | A | | 9/2008 | |
| JP | 2008207643 | A | * | 9/2008 | |
| JP | 2010-70008 | A | | 4/2010 | |
| JP | 2010143426 | A | * | 7/2010 | |
| JP | 2010149559 | A | * | 7/2010 | |
| JP | 2010149560 | A | * | 7/2010 | |
| JP | 2013107543 | A | * | 6/2013 | ............. B60K 6/48 |
| JP | 2013112190 | A | * | 6/2013 | ........... B60W 10/06 |
| JP | 2013154705 | A | * | 8/2013 | ............ B60K 6/547 |
| JP | 2013154723 | A | * | 8/2013 | ......... B60W 10/115 |
| JP | 2014-151909 | A | | 8/2014 | |
| JP | 2014218168 | A | * | 11/2014 | ............ B60K 6/547 |

OTHER PUBLICATIONS

Jun. 21, 2016 International Search Report issued in International Patent Application No. PCT/JP2016/060069.

\* cited by examiner

CONTROL DEVICE FOR STARTING AN INTERNAL COMBUSTION ENGINE DURING A SHIFTING OPERATION

BACKGROUND

The present disclosure relates to a control device for controlling a vehicle drive system.

Hybrid vehicles that use both an internal combustion engine and a rotating electric machine as a source to drive wheels are in practical use. As one example of a vehicle drive system used in such hybrid vehicles, a system disclosed in Japanese Patent Application Publication No. 2007-99141 is known. The vehicle drive system of Japanese Patent Application Publication No. 2007-99141 includes an engagement device (a first clutch 6), a rotating electric machine (a motor/generator 5), and a multi-stage automatic transmission (an automatic transmission 3) that are provided in a power transfer path connecting an internal combustion engine (an engine 1) to wheels (right and left rear wheels 2).

The vehicle drive system of Japanese Patent Application Publication No. 2007-99141 is structured to achieve the following modes: an electric travel mode that allows a vehicle to travel on the torque of the rotating electric machine with the engagement device in a disengagement state; and a hybrid travel mode that allows the vehicle to travel on the torques of the internal combustion engine and the rotating electric machine with the engagement device in an engagement state. When a mode switches from the electric travel mode to the hybrid travel mode, a control device for controlling the vehicle drive system of Japanese Patent Application Publication No. 2007-99141 brings the engagement device into a slip engagement state and performs start control of the internal combustion engine by using the torque of the rotating electric machine. At this time, the transfer torque capacity of the engagement device brought into the slip engagement state is set in accordance with the magnitude of a torque required to raise the rotational speed of the internal combustion engine.

SUMMARY

In conventional vehicles that have no rotating electric machine in a power transfer path between an internal combustion engine and a multi-stage automatic transmission, the rotational speed of the internal combustion engine is actively changed by torque control of the internal combustion engine during a shifting operation of the multi-stage automatic transmission so that the input rotational speed of the multi-stage automatic transmission can approach its post-shifting rotational speed. This control is performed to reduce shock transferred to wheels and to shorten the shifting operation period. Normally, the difference between a target for the torque control of the internal combustion engine and an actual output torque is small, and the rotation of the internal combustion engine is directly inputted to the multi-stage automatic transmission. Thus, it is common to use feedforward control for such torque control of an internal combustion engine.

However, like in the vehicle drive system of Japanese Patent Application Publication No. 2007-99141, in a structure where an engagement device and a rotating electric machine are provided in a power transfer path between an internal combustion engine and a multi-stage automatic transmission, the engagement device is brought into a slip engagement state in some cases, such as, when start control of the internal combustion engine is performed. In such cases, it is difficult to adjust the input rotational speed of the multi-stage automatic transmission performing a shifting operation to a target by feedforward-control of torques inputted to the multi-stage automatic transmission, namely, the torques of the internal combustion engine and the rotating electric machine. This is because the transfer torque capacity of the engagement device brought into the slip engagement state may deviate from a target or fluctuate. In other words, regardless of whether the feedforward-control of the torques of the internal combustion engine and the rotating electric machine is performed as intended, if the transfer torque capacity of the engagement device brought into the slip engagement state is not controlled as intended, the input torque of the multi-stage automatic transmission deviates from its target, and accordingly, the input rotational speed of the multi-stage automatic transmission performing the shifting operation fluctuates. As a result, drivability may be degraded.

An exemplary aspect of the disclosure maintains good drivability even when the shifting operation coincides with the start control of the internal combustion engine.

A control device according to the present disclosure is for controlling a vehicle drive system in which an engagement device, a rotating electric machine, and a multi-stage automatic transmission are provided in a power transfer path connecting an internal combustion engine to wheels, the control device includes an electronic control unit that is configured to, when engaging the engagement device to start the internal combustion engine during a shifting operation of the multi-stage automatic transmission under a condition where a vehicle travels on a torque of the rotating electric machine with the engagement device in a disengagement state, the electronic control device causes a rotational speed of the rotating electric machine to change according to a predetermined first change pattern after the rotational speed of the rotating electric machine changes from a pre-shifting synchronous rotational speed in association with progress of the shifting operation until reaching a first synchronous range that is determined on the basis of a rotational speed of the internal combustion engine, where the pre-shifting synchronous rotational speed is the rotational speed of the rotating electric machine in a shift speed established before the shifting operation is started.

According to this structure, when the shifting operation coincides with start control of the internal combustion engine, rotational speed control of the rotating electric machine is performed according to the first change pattern after the rotational speed of the rotating electric machine changes from the pre-shifting synchronous rotational speed until reaching the first synchronous range of the rotational speed of the internal combustion engine. If there arises a difference between an actual value and a target value of the transfer torque capacity of the engagement device, the rotational speed control of the rotating electric machine corrects the output torque of the rotating electric machine in accordance with the difference, thereby maintaining the rotational acceleration of an input member of the multi-stage automatic transmission stable. Thus, good drivability is maintained.

Other features and advantages of the technique according to the present disclosure will be better understood by referring to the following description of exemplary non-limiting embodiments in conjunction with the drawings.

DETAILED DESCRIPTION OF EMBODIMENTS

An embodiment of a control device is described. A control device 1 is a control device for a vehicle drive system and controls a vehicle drive system 3. The vehicle drive system 3 to be controlled by the control device 1 is a drive system (a hybrid vehicle drive system) for driving a vehicle (a hybrid vehicle) provided with both an internal combustion engine EG and a rotating electric machine 33 that each serve as a driving source for wheels W. The vehicle drive system 3 is structured as a vehicle drive system for driving a parallel hybrid vehicle that employs a parallel hybrid system.

In the description below, "drivingly coupled" refers to a state where two rotational elements are coupled to transfer a driving force (identical in meaning to a torque) therebetween. This concept includes a state where two rotating elements are coupled to rotate together and a state where two rotating elements are coupled through at least one transfer member to transfer a driving force therebetween. Such a transfer member includes various types of members (a shaft, a gear mechanism, a belt, etc.) that transfer rotation while maintaining or changing the rotational speed, and may include an engagement device (a friction engagement device, an intermesh engagement device, etc.) that selectively transfers rotation and a driving force.

The "rotating electric machine" is used as a concept including a motor (an electric motor), a generator (an electric generator), and a motor-generator that functions as either a motor or a generator as needed.

Regarding the state of engagement of a friction engagement device, an "engagement state" refers to a state where a transfer torque capacity is generated at the friction engagement device. The transfer torque capacity is the maximum torque that the friction engagement device is allowed to transfer by friction. The magnitude of the transfer torque capacity is determined in proportion to a pressure (an engagement pressure) that press a pair of engagement members (an input engagement member and an output engagement member) of the friction engagement device against each other. The "engagement state" includes a "direct engagement state" where there is no rotational speed difference (slip) between the pair of engagement members and a "slip engagement state" where there is a rotational speed difference between the pair of engagement members. A "disengagement state" refers to a state where no transfer torque capacity is generated at the friction engagement device. The "disengagement state" includes a state where, although the control device 1 does not command the friction engagement device to generate the transfer torque capacity, the transfer torque capacity is generated by drag between the engagement members (friction members).

Figure 1:
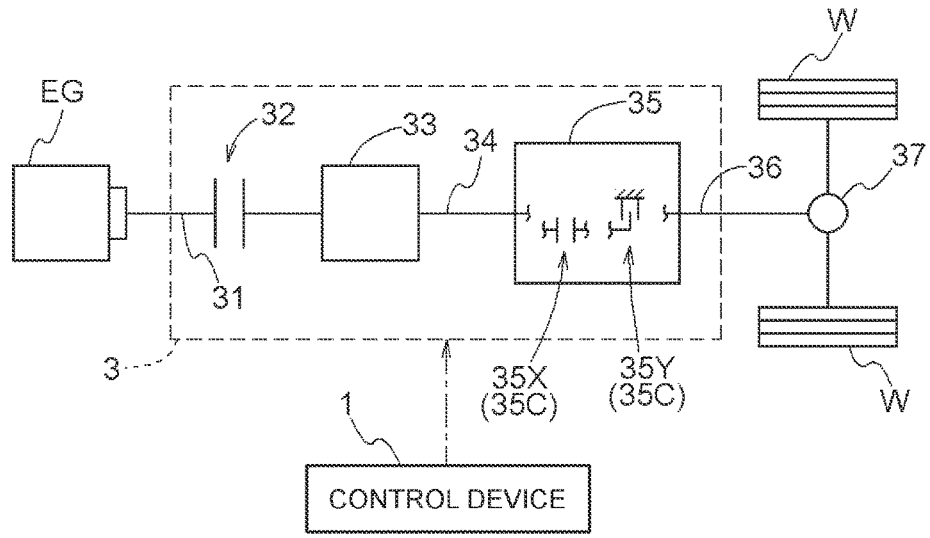
FIG. 1 is a schematic diagram of a vehicle drive system according to an embodiment.

As illustrated in FIG. 1, the vehicle drive system 3 includes a decoupling engagement device 32, the rotating electric machine 33, and a transmission 35 that are provided in a power transfer path connecting the internal combustion engine EG to the wheels W. To transfer rotation and a drive force between the components in the power transfer path, the vehicle drive system 3 includes an input member 31, a shifting input member 34, and an output member 36. In the power transfer path, the input member 31, the decoupling engagement device 32, the rotating electric machine 33, the shifting input member 34, the transmission 35, and the output member 36 are arranged in the order mentioned from the internal combustion engine EG side.

The input member 31 is drivingly coupled to the internal combustion engine EG. The internal combustion engine EG is a motor (a gasoline engine, a diesel engine, etc.) that is driven by the combustion of a fuel in the engine and thus generates power. The input member 31 is structured with, for example, a shaft member. The input member 31 is drivingly coupled to an internal combustion engine output member (e.g., a crankshaft) that is an output member of the internal combustion engine EG. The input member 31 can be coupled either directly or via another member, such as a damper, to the internal combustion engine output member. The input member 31 is drivingly coupled to the rotating electric machine 33 via the decoupling engagement device 32.

The decoupling engagement device 32 selectively drivingly couples the input member 31 and the rotating electric machine 33. In other words, the decoupling engagement device 32 allows the internal combustion engine EG and the rotating electric machine 33 to be released from the drivingly-coupled state. The decoupling engagement device 32 functions as an engagement device for decoupling an internal combustion engine. According to the present embodiment, the decoupling engagement device 32 is a friction engagement device. For example, a wet multi-plate clutch can be used as the decoupling engagement device 32. According to the present embodiment, the decoupling engagement device 32 corresponds to an "engagement device".

The rotating electric machine 33 includes the following: a stator fixed to a case that is a non-rotating member; and a rotor rotatably supported radially inside the stator. The rotating electric machine 33 is connected to an electricity storage device via an inverter device. The rotating electric machine 33 receives electric power from the electricity storage device, thus performing power running, or supplies, to the electricity storage device, electric power generated by the torque of the internal combustion engine EG and the inertia force on a vehicle, thus charging the electricity storage device. The rotor of the rotating electric machine 33 is coupled to and rotates with the shifting input member 34. The shifting input member 34 is structured, for example, with a shaft member. The shifting input member 34 that rotates with the rotor is drivingly coupled to the transmission 35.

The transmission 35 is structured as a multi-stage automatic transmission. According to the present embodiment, the transmission 35 includes a planetary gear mechanism and multiple shifting engagement devices 35C. The shifting engagement devices 35C include one or multiple clutches 35X and one or multiple brakes 35Y. According to the present embodiment, the clutch 35X and the brake 35Y of the shifting engagement devices 35C are friction engagement devices. For example, a wet multi-plate clutch and a wet multi-plate brake can be used as the shifting engagement devices 35C. It is noted that the shifting engagement devices 35C may include one or multiple one-way clutches.

The transmission 35 is allowed to selectively establish any of multiple shift speeds in accordance with the state of engagement of each of the shifting engagement devices 35C. For example, the transmission 35 selectively engages two of the multiple shifting engagement devices 35C and establishes a shift speed corresponding to a combination of the engaged shifting engagement devices 35C. The transmission 35 shifts the rotational speed of the shifting input member 34 at a speed ratio corresponding to the established shift speed and transfers it to the output member 36. The "speed ratio" is a ratio of the rotational speed of the shifting input member 34 to the rotational speed of the output member 36 and is a value calculated by dividing the rotational speed of the shifting input member 34 by the rotational speed of the output member 36. The output member 36 is structured, for example, with a shaft member.

The output member 36 is drivingly coupled to the pair of right and left wheels W via a differential gear device 37. A torque transferred to the output member 36 is divided through the differential gear device 37 and transferred to the right and left two wheels W. Thus, the vehicle drive system 3 transfers the torque of one or each of the internal combustion engine EG and the rotating electric machine 33, thereby allowing a vehicle to travel.

Figure 2:
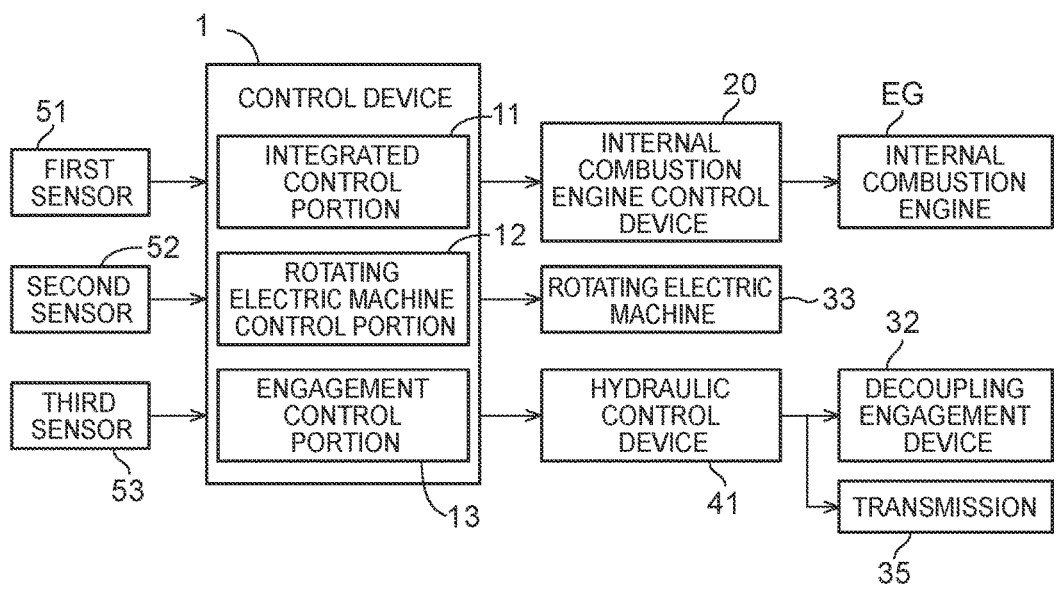
FIG. 2 is a block diagram illustrating a schematic structure of a control device.

The control device 1 functions as a core member for controlling the operation of each portion of the vehicle drive system 3. As illustrated in FIG. 2, the control device 1 includes an integrated control portion 11, a rotating electric machine control portion 12, and an engagement control portion 13. These functional portions are structured by software (programs) stored in a storage medium, such as a memory, by additional hardware, such as a computing circuit, or by both of them. The functional portions are allowed to exchange information with each other. Further, the control device 1 is allowed to acquire information on the results detected by various sensors (a first sensor 51 to a third sensor 53) mounted on parts of a vehicle provided with the vehicle drive system 3.

The first sensor 51 detects the rotational speed of the input member 31 or a member (e.g., the internal combustion engine EG) that rotates synchronously with the input member 31. The "rotate synchronously" means that subject rotating members rotate together or rotate at proportional rotational speeds. The second sensor 52 detects the rotational speed of the shifting input member 34 or a member (e.g., the rotating electric machine 33) that rotates synchronously with the shifting input member 34. The third sensor 53 detects the rotational speed of the output member 36 or a member (e.g., the wheels W) that rotates synchronously with the output member 36. The control device 1 is allowed to calculate a vehicle speed on the basis of the result detected by the third sensor 53. In addition, the control device 1 may be allowed to acquire information on, for example, an accelerator operation amount, a brake operation amount, and the amount of electricity stored in the electricity storage device.

The integrated control portion 11 performs control that integrates various types of control (including torque control, rotational speed control, and engagement control) on the internal combustion engine EG, the rotating electric machine 33, the decoupling engagement device 32, the transmission 35 (the shifting engagement devices 35C), etc., into a whole throughout the vehicle. The integrated control portion 11 calculates, on the basis of sensor detection information (information mainly on the accelerator operation amount and the vehicle speed), a vehicle required torque that is required to drive the vehicle (the wheels W).

Further, the integrated control portion 11 determines a travel mode on the basis of the sensor detection information (information mainly on the accelerator operation amount, the vehicle speed, and the amount of electricity stored in the electricity storage device). According to the present embodiment, the travel mode selectable by the integrated control portion 11 includes an electric travel mode (hereinafter, referred to as "EV mode") and a hybrid travel mode (hereinafter, referred to as "HEV mode"). The EV mode is a mode that transfers the torque of only the rotating electric machine 33 to the wheels W so as to allow the vehicle to travel. The HEV mode is a mode that transfers the torques of both the internal combustion engine EG and the rotating electric machine 33 to the wheels W so as to allow the vehicle to travel.

The integrated control portion 11 determines, on the basis of the determined travel mode, the sensor detection information, etc., a torque (an internal combustion engine required torque) that the internal combustion engine EG is required to output and a torque (a rotating electric machine required torque) that the rotating electric machine 33 is required to output. The integrated control portion 11 determines, on the basis of the determined travel mode, the sensor detection information, etc., the state of engagement of the decoupling engagement device 32, a target shift speed that the transmission 35 is caused to establish, etc.

According to the embodiment, the integrated control portion 11 is structured to manage internal combustion engine start control when a mode switches from the EV mode to the HEV mode. The internal combustion engine start control is control that brings the decoupling engagement device 32 in the disengagement state into a slip engagement state when the vehicle travels in the EV mode, thus starting the internal combustion engine EG by using the torque of the rotating electric machine 33.

According to the present embodiment, the control device 1 (the integrated control portion 11) controls the operating point (the output torque and the rotational speed) of the internal combustion engine EG via an internal combustion engine control device 20. The internal combustion engine control device 20 is allowed to select either torque control or rotational speed control of the internal combustion engine EG in accordance with the traveling condition of the vehicle. The torque control is control that provides the internal combustion engine EG with a command indicative of a target torque and causes the output torque of the internal combustion engine EG to follow the target torque. The rotational speed control is control that provides the internal combustion engine EG with a command indicative of a target rotational speed and determines an output torque that causes the rotational speed of the internal combustion engine EG to follow the target rotational speed.

The rotating electric machine control portion 12 controls the operating point (the output torque and the rotational speed) of the rotating electric machine 33. The rotating electric machine control portion 12 is allowed to select either torque control or rotational speed control of the rotating electric machine 33 in accordance with the traveling condition of the vehicle. The torque control is control that provides the rotating electric machine 33 with a command indicative of a target torque and causes the output torque of the rotating electric machine 33 to follow the target torque. The rotational speed control is control that provides the rotating electric machine 33 with a command indicative of a target rotational speed and determines an output torque that causes the rotational speed of the rotating electric machine 33 to follow the target rotational speed.

The engagement control portion 13 controls the state of engagement of the decoupling engagement device 32 and the state of engagement of the multiple shifting engagement devices 35C that the transmission 35 includes. According to the present embodiment, the decoupling engagement device 32 and the multiple shifting engagement devices 35C are hydraulically-driven friction engagement devices. The engagement control portion 13 controls, via a hydraulic control device 41, a hydraulic pressure supplied to each of the decoupling engagement device 32 and the shifting engagement devices 35C, thereby controlling the state of engagement of the decoupling engagement device 32 and the shifting engagement devices 35C.

The engagement pressure of each of the engagement devices changes in proportion to the magnitude of the hydraulic pressure supplied to that engagement device. Accordingly, the magnitude of the transfer torque capacity generated at each of the engagement devices changes in proportion to the magnitude of the hydraulic pressure supplied to that respective engagement device. In accordance with the supplied hydraulic pressure, each of the engagement devices is brought into any of the following states of engagement: the direct engagement state; the slip engagement state; and the disengagement state. The hydraulic control device 41 includes a hydraulic control valve (e.g., a linear solenoid valve) for regulating the hydraulic pressure of hydraulic oil supplied from an oil pump (not illustrated). For example, the oil pump may be a mechanical pump driven by the input member 31 or by the shifting input member 34, or may be an electric pump driven by a rotating electric machine dedicated to the pump. The hydraulic control device 41 regulates the degree of opening of the hydraulic control valve in accordance with a hydraulic command from the engagement control portion 13, thus supplying the hydraulic oil with a hydraulic pressure corresponding to the hydraulic command to each of the engagement devices.

The engagement control portion 13 controls the state of engagement of the decoupling engagement device 32 so that the travel mode determined by the integrated control portion 11 is established. For example, when establishing the EV mode, the engagement control portion 13 brings the decoupling engagement device 32 into the disengagement state, and when establishing the HEV mode, the engagement control portion 13 brings the decoupling engagement device 32 into the direct engagement state. Further, when the mode switches from the EV mode to the HEV mode, the engagement control portion 13 brings the decoupling engagement device 32 first into the slip engagement state and then into the direct engagement state.

The engagement control portion 13 controls the state of engagement of each of the multiple shifting engagement devices 35C so that a target shift speed determined by the integrated control portion 11 is established. The engagement control portion 13 brings two of the shifting engagement devices 35C corresponding to the target shift speed into the direct engagement state while bringing all the others of the shifting engagement devices 35C into the disengagement state. Further, if a change occurs in the target shift speed while the vehicle travels in the EV mode or the HEV mode, the engagement control portion 13 switches specific shifting engagement devices 35C from the direct engagement state to the disengagement state and switches other specific shifting engagement devices 35C from the disengagement state to the engagement state, on the basis of the difference in the shifting engagement devices 35C required to be brought into the direct engagement state between before and after the change in the target shift speed occurs. In the description below, "disengaged engagement device 35R" refers to the shifting engagement device 35C freshly brought into the disengagement state during the shifting operation, and "coupled engagement device 35A" refers to the shifting engagement device 35C freshly brought into the engagement state (coupled) during the shifting operation.

Figure 3:
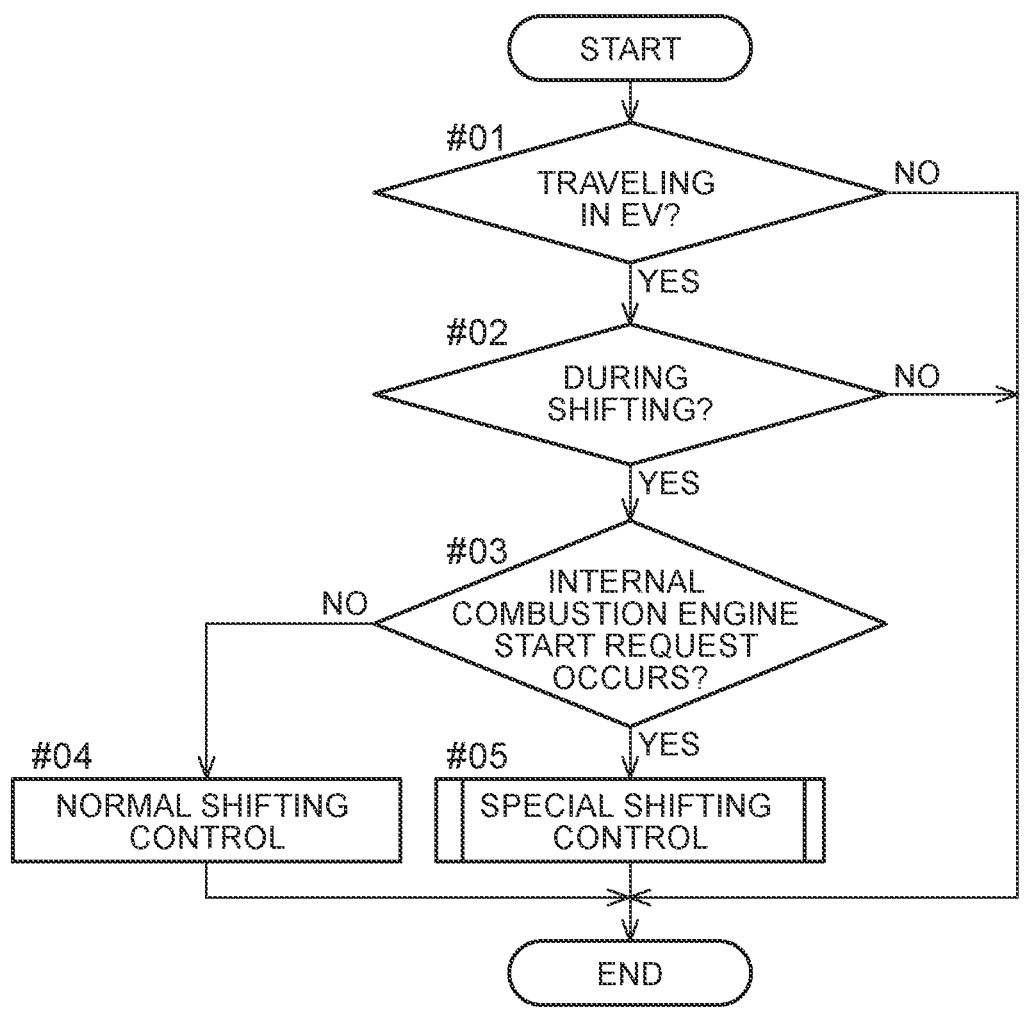
FIG. 3 is a flowchart illustrating a procedure of start coincidence shifting control.
Figure 4:
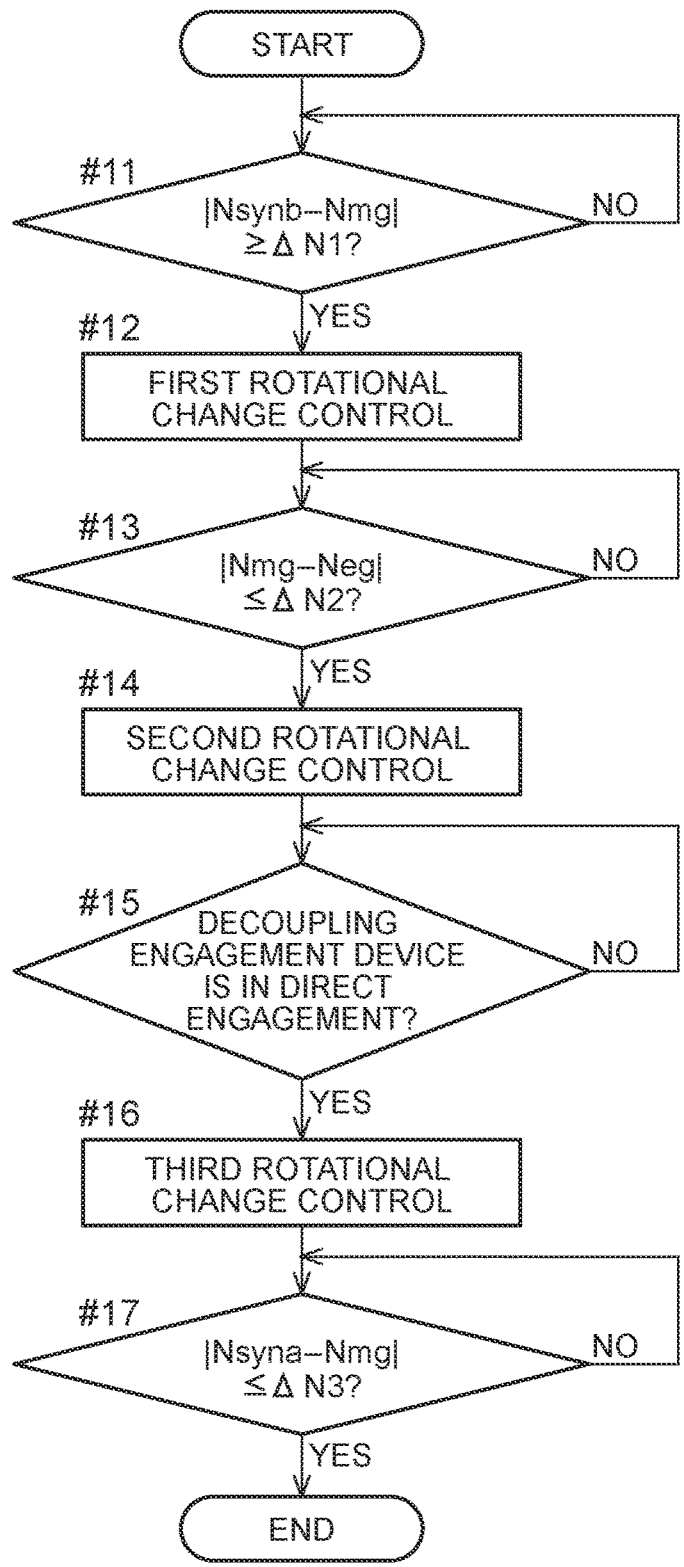
FIG. 4 is a flowchart illustrating a procedure of special shifting control.

According to the present embodiment, the control device 1 performs start coincidence shifting control when engaging the decoupling engagement device 32 to start the internal combustion engine EG during the shifting operation of the transmission 35 under a condition where the vehicle travels on the torque of the rotating electric machine 33 with the decoupling engagement device 32 disengaged. The control device 1 performs the start coincidence shifting control, for example, if shifting control associated with changing the target shift speed coincides with the start control of the internal combustion engine EG for mode switching to the HEV mode while the vehicle travels in the EV mode. The start coincidence shifting control is performed according to procedures illustrated in FIG. 3 and FIG. 4.

First, it is determined whether the travel mode determined by the integrated control portion 11 is the EV mode (step #01). If the vehicle travels in the EV mode (Yes in #01), it is determined whether the integrated control portion 11 has changed the target shift speed (#02). It is determined whether, during the shifting operation (#02 in Yes), the integrated control portion 11 changes the travel mode to the HEV mode (#03). If the travel mode is not changed to the HEV mode, so that no request to start the internal combustion engine EG occurs (No in #03), normal shifting control is performed (#04). The normal shifting control causes the shifting operation to progress while controlling the engagement pressures of the disengaged engagement device 35R and the coupled engagement device 35A according to conventional practice.

Figure 5:
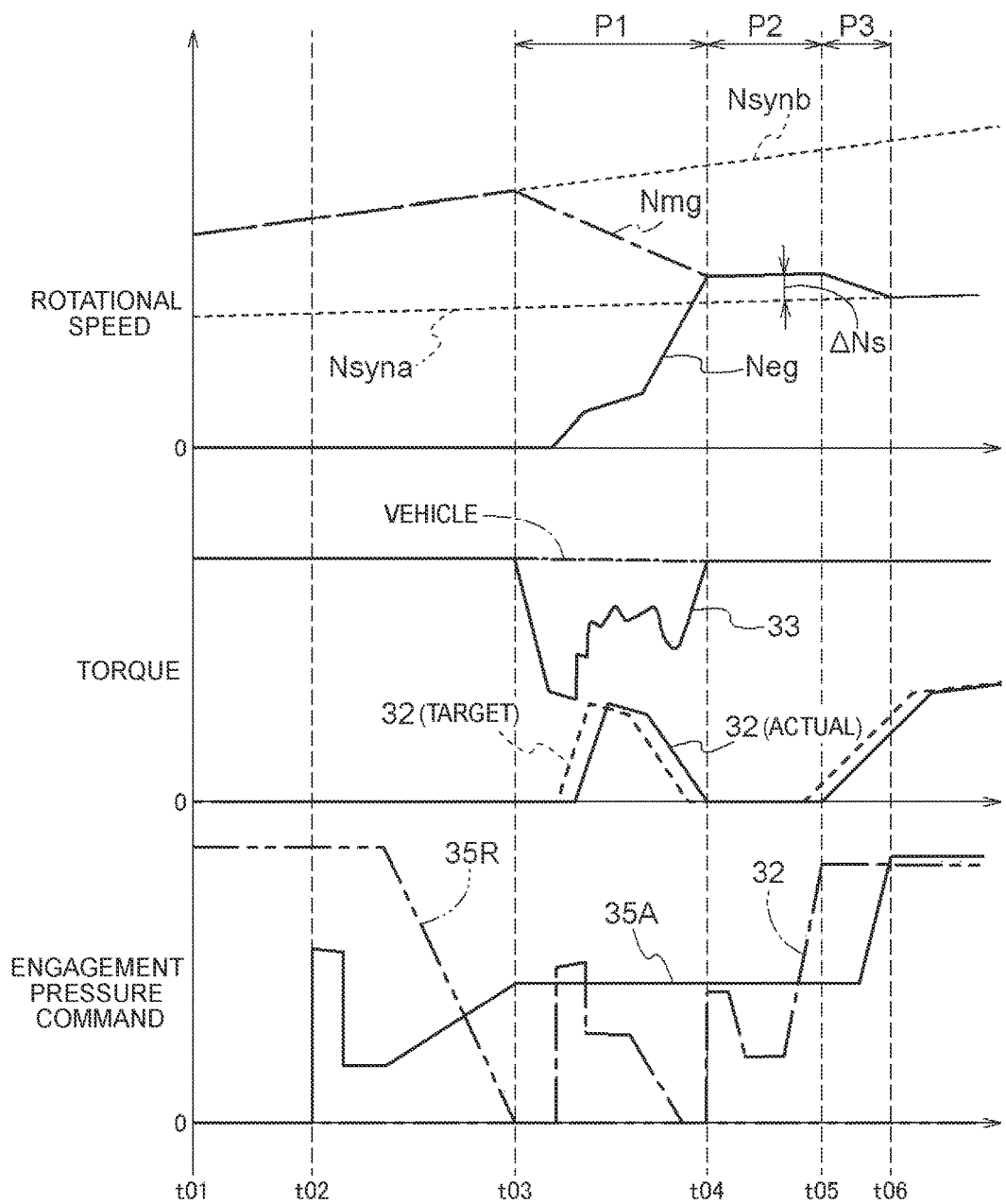
FIG. 5 is a timing chart illustrating an example of the start coincidence shifting control.

In contrast, if the travel mode is changed to the HEV mode during the shifting operation while the vehicle travels in the EV mode, so that a request to start the internal combustion engine EG occurs (Yes in #03), special shifting control that is characteristic of the control device 1 according to the present embodiment is performed (#05). An example of the special shifting control is described here with further reference to a timing chart of FIG. 5. Assuming that the target shift speed is changed at a time t01, the coupled engagement device 35A starts being engaged at a time t02, and then the disengaged engagement device 35R starts being disengaged. Assuming that a request to start the internal combustion engine EG occurs during the shifting operation before a time t03 when the disengaged engagement device 35R reaches the disengagement state, the coupled engagement device 35A is maintained in the slip engagement state.

When the actual value of the transfer torque capacity of the coupled engagement device 35A in the slip engagement state gradually increases as the shifting operation progresses, the rotational speed of the shifting input member 34 changes from a pre-shifting synchronous rotational speed Nsynb soon. The pre-shifting synchronous rotational speed Nsynb here refers to an imaginary rotational speed of the shifting input member 34 that is calculated on the basis of the rotational speed of the output member 36 detected by the third sensor 53 and the speed ratio of the shift speed established before the shifting. Specifically, the pre-shifting synchronous rotational speed Nsynb is calculated by multiplying the rotational speed of the output member 36 by the speed ratio of the shift speed established before the shifting. Since the shifting input member 34 rotates with the rotating electric machine 33, the pre-shifting synchronous rotational speed Nsynb at a point in time when the rotational speed of the shifting input member 34 starts changing is equal to a rotational speed Nmg of the rotating electric machine 33 in the shift speed established before the shifting operation starts.

In the special shifting control, first, it is determined whether the rotational speed Nmg of the rotating electric machine 33 changes from the pre-shifting synchronous rotational speed Nsynb in association with the progress of the shifting operation. In the present example, it is determined whether a difference (an absolute value) between the pre-shifting synchronous rotational speed Nsynb calculated on the basis of the rotational speed of the output member 36 detected by the third sensor 53 and the rotational speed Nmg of the rotating electric machine 33 detected by the second sensor 52 is greater than or equal to a first determination differential rotational speed $\Delta N1$ (#11). It is preferable that the first determination differential rotational speed $\Delta N1$ be set to any value, for example, between 20 and 100 [rpm].

For example, if an affirmative determination is made at the time t03 (Yes in #11), then first rotational change control is performed (#12) to cause the rotational speed Nmg of the rotating electric machine 33 change according to a first change pattern. The first change pattern is a pattern in which the rotational speed changes at a constant time rate of change. During upshift as in the present example, the first change pattern is a pattern in which the rotational speed decreases at a constant time rate of change. In a first phase P1, the rotating electric machine control portion 12 provides the rotating electric machine 33 with a command indicative of a target rotational speed decreasing at a constant time rate of change, and controls the rotating electric machine 33 so that the rotational speed of the rotating electric machine 33 follows the target rotational speed. It is noted that the first phase P1 corresponds to an inertia phase of the normal shifting control.

After the time t03, the decoupling engagement device 32 is brought into the slip engagement state. At this time, the transfer torque capacity of the decoupling engagement device 32 is set equal to the magnitude of a torque required to raise the rotational speed of the internal combustion engine EG that is not rotating. The rotational speed of the internal combustion engine EG increases by the torque of the rotating electric machine 33 that is transferred via the decoupling engagement device 32. After that, when the rotational speed of the internal combustion engine EG reaches a combustion start rotational speed, spark ignition occurs, so that the internal combustion engine EG rotates independently.

The first rotational change control is performed until the rotational speed Nmg of the rotating electric machine 33 reaches a first synchronous range that is determined on the basis of a rotational speed Neg of the internal combustion engine EG. The first synchronous range is a rotational speed range in which the rotational speed Nmg of the rotating electric machine 33 rotates synchronously with or is considered as rotating synchronously with the rotational speed Neg of the internal combustion engine EG. The first synchronous range can be a rotational speed range from a rotational speed lower than the rotational speed Neg of the internal combustion engine EG by a second determination differential rotational speed $\Delta N2$ to a rotational speed higher than the rotational speed Neg of the internal combustion engine EG by the second determination differential rotational speed $\Delta N2$ inclusive. It is preferable that the second determination differential rotational speed $\Delta N2$ be set to any value, for example, between 20 and 100 [rpm]. In the present example, during the performance of the first rotational change control, it is determined whether a difference (an absolute value) between the rotational speed Neg of the internal combustion engine EG detected by the first sensor 51 and the rotational speed Nmg of the rotating electric machine 33 detected by the second sensor 52 is lower than or equal to the second determination differential rotational speed $\Delta N2$ (#13).

For example, if an affirmative determination is made at a time t04 (Yes in #13), then second rotational change control is performed (#14) to cause the rotational speed Nmg of the rotating electric machine 33 to change according to a second change pattern. The second change pattern is a pattern that maintains a differential rotation (a slip differential rotation $\Delta Ns$ in the present example) relative to a post-shifting synchronous rotational speed Nsyna within a constant range. The second change pattern is a pattern that is set dynamically in accordance with a change in the vehicle speed. It is noted that the slip differential rotation $\Delta Ns$ is set to a value (e.g., between 100 to 300 [rpm]) significantly larger than the second determination differential rotational speed $\Delta N2$ and a third determination differential rotational speed $\Delta N3$, which will be described later. The post-shifting synchronous rotational speed Nsyna is an imaginary rotational speed of the shifting input member 34 that is calculated on the basis of the rotational speed of the output member 36 detected by the third sensor 53 and the speed ratio of the shift speed established after the shifting. Specifically, the post-shifting synchronous rotational speed Nsyna is calculated by multiplying the rotational speed of the output member 36 by the speed ratio of the shift speed established after the shifting. Since the shifting input member 34 rotates with the rotating electric machine 33, the post-shifting synchronous rotational speed Nsyna is equal to an imaginary rotational speed of the rotating electric machine 33 in the shift speed established after the shifting operation is completed. In a second phase P2 subsequent to the first phase P1, the rotating electric machine control portion 12 provides the rotating electric machine 33 with a command indicative of a target rotational speed that is set to have the slip differential rotation $\Delta Ns$ relative to the post-shifting synchronous rotational speed Nsyna. Then, the rotating electric machine control portion 12 controls the rotating electric machine 33 so that the rotational speed of the rotating electric machine 33 follows the target rotational speed.

With the second rotational change control being performed, the decoupling engagement device 32 is brought into the direct engagement state. In other words, during the performance of the second rotational change control, it is determined whether the decoupling engagement device 32 reaches the direct engagement state (#15), and the second rotational change control is performed until the decoupling engagement device 32 reaches the direct engagement state. It is noted that whether or not the decoupling engagement device 32 reaches the direct engagement state can be determined on the basis of whether or not an engagement command pressure for the decoupling engagement device 32 becomes equal to a predetermined direct engagement pressure.

For example, if an affirmative determination is made at a time t05 (Yes in #15), then third rotational change control is performed (#16) to cause the rotational speed Nmg of the rotating electric machine 33 to change according to a third change pattern. The third change pattern here refers to a pattern in which the rotational speed changes toward the post-shifting synchronous rotational speed Nsyna at a constant time rate of change. During upshift as in the present example, the third change pattern is a pattern in which the rotational speed decreases toward the post-shifting synchronous rotational speed Nsyna at a constant time rate of change. In a third phase P3 subsequent to the second phase P2, the rotating electric machine control portion 12 provides the rotating electric machine 33 with a command indicative of a target rotational speed that decreases toward the post-shifting synchronous rotational speed Nsyna at a constant time rate of change, and controls the rotating electric machine 33 so that the rotational speed of the rotating electric machine 33 follows the target rotational speed.

The third rotational change control is performed until the rotational speed Nmg of the rotating electric machine 33 reaches a second synchronous range that is determined on the basis of the post-shifting synchronous rotational speed Nsyna. The second synchronous range is a rotational speed range in which the rotational speed Nmg of the rotating electric machine 33 rotates synchronously with or is considered as rotating synchronously with the post-shifting synchronous rotational speed Nsyna. The second synchronous range can be a rotational speed range, for example, from a rotational speed lower than the post-shifting synchronous rotational speed Nsyna by a third determination differential rotational speed ΔN3 to a rotational speed higher than the post-shifting synchronous rotational speed Nsyna by the third determination differential rotational speed ΔN3 inclusive. It is preferable that the third determination differential rotational speed ΔN3 be set to any value, for example, between 20 and 100 [rpm]. In the present example, during the performance of the third rotational change control, it is determined whether a difference (an absolute value) between the post-shifting synchronous rotational speed Nsyna calculated on the basis of the rotational speed of the output member 36 detected by the third sensor 53 and the rotational speed Nmg of the rotating electric machine 33 detected by the second sensor 52 is lower than or equal to the third determination differential rotational speed ΔN3 (#17).

For example, if an affirmative determination is made at a time t06, the coupled engagement device 35A is brought into the direct engagement state, and then the start coincidence shifting control ends.

According to the control characteristic of the control device 1 of the present embodiment, the rotational speed control (the first rotational change control described above) of the rotating electric machine 33 is performed in the first phase P1, corresponding to the inertia phase of the normal shifting control, during the start coincidence shifting control. If a difference occurs between the actual value and the target value of the transfer torque capacity of the decoupling engagement device 32, the first rotational change control corrects the output torque of the rotating electric machine 33 in accordance with the difference (refer to the period from the time t03 to t04 in FIG. 5). Consequently, the rotational acceleration of the shifting input member 34 is maintained constant in accordance with a change in the rotational speed Nmg of the rotating electric machine 33. Thus, good drivability is maintained.

Figure 6:
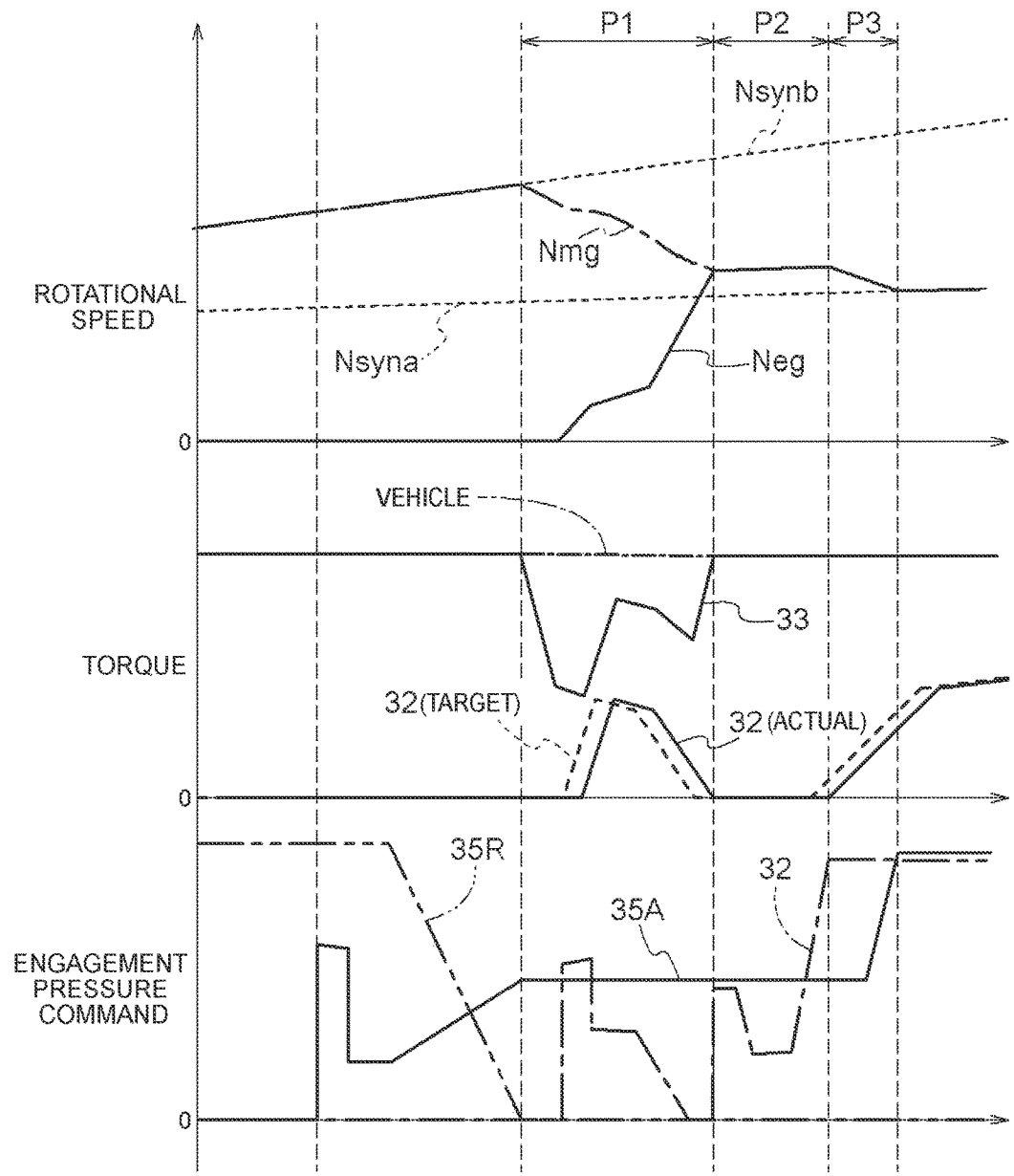
FIG. 6 is a timing chart illustrating a comparison example of the start coincidence shifting control.

FIG. 6 illustrates a comparison example in which the torque control of the rotating electric machine 33 is performed in the first phase P1 to cause the rotating electric machine 33 to output a torque equivalent to the transfer torque capacity of the decoupling engagement device 32. In this case, the drivability gets degraded because the rotational acceleration of the shifting input member 34 fluctuates due to the difference occurring between the actual value and the target value of the transfer torque capacity of the decoupling engagement device 32. As can be easily seen by comparing FIG. 5 and FIG. 6, the start coincidence shifting control according to the present embodiment makes it possible to improve shifting quality when the difference occurs in the transfer torque capacity of the decoupling engagement device 32.

(Other Embodiments)

Figure 7:
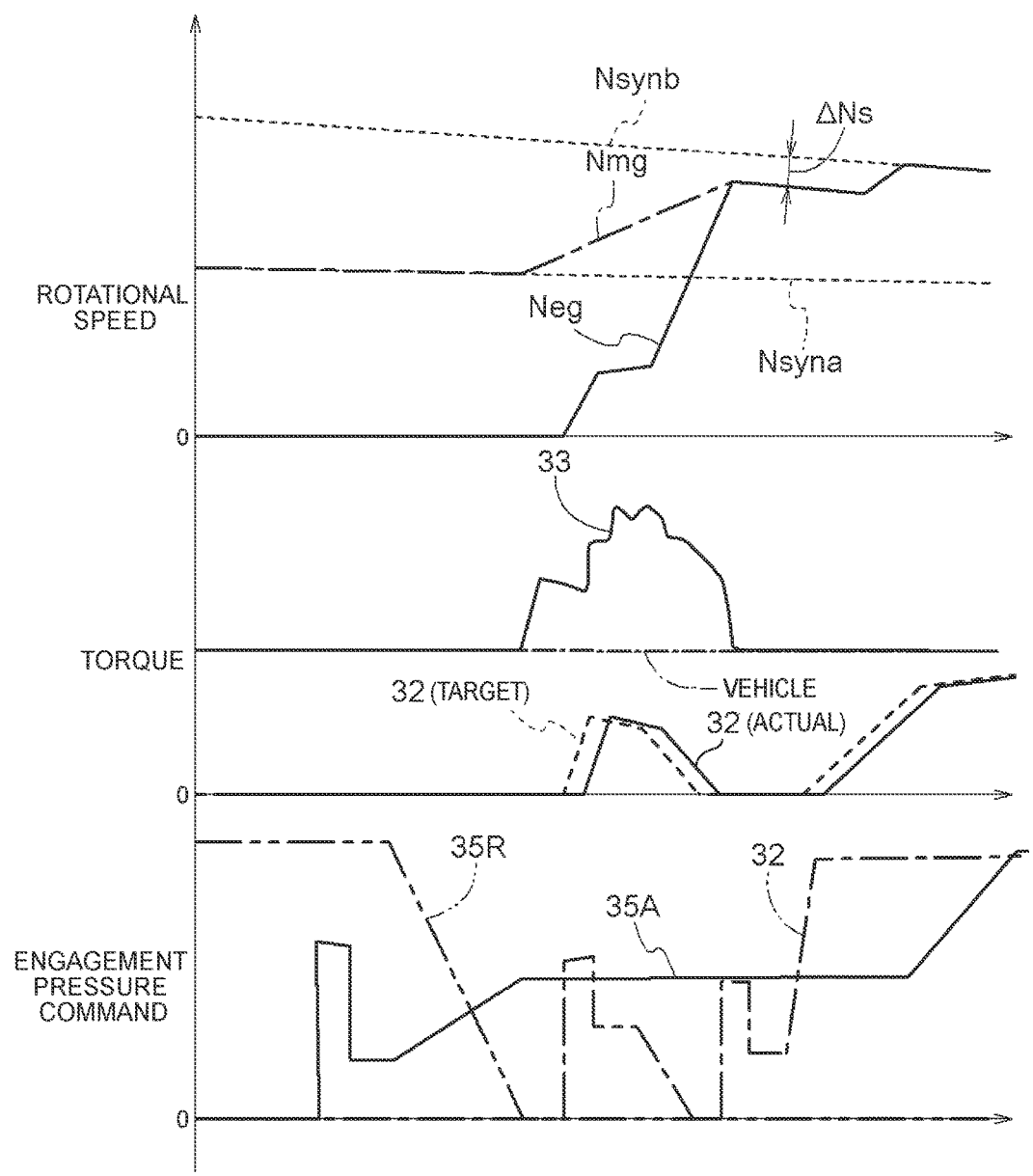
FIG. 7 is a timing chart illustrating another example of the start coincidence shifting control.

(1) The example used to describe the embodiment is based mainly on the assumption that upshift shifting coincides with the start control of the internal combustion engine EG. However, without being limited to such a structure, for example, when downshift shifting coincides with the start control for the internal combustion engine EG, the start coincidence shifting control is performable in a similar way. FIG. 7 illustrates a timing chart of the start coincidence shifting control in this case. Also at the time of downshift shifting, it is possible to maintain good drivability by performing the first rotational change control after the rotational speed Nmg of the rotating electric machine 33 changes from the pre-shifting synchronous rotational speed Nsynb in association with the progress of the shifting operation until reaching the first synchronous range.

(2) In the example used to describe the embodiment, the first rotational change control causes the rotational speed Nmg of the rotating electric machine 33 to change at a constant time rate of change. However, without being limited to such a structure, for example, the first rotational change control may slightly change the change rate (the rotational acceleration) of the rotational speed Nmg of the rotating electric machine 33. The change rate (the rotational acceleration) of the rotational speed Nmg of the rotating electric machine 33 may become smaller, for example, as the rotational speed Nmg of the rotating electric machine 33 approaches the first synchronous range.

(3) In the example used to describe the embodiment, the second rotational change control causes the rotational speed Nmg of the rotating electric machine 33 to change so as to maintain a differential rotation within a constant range, relative to the post-shifting synchronous rotational speed Nsyna. However, without being limited to such a structure, for example, the second rotational change control may slightly change the differential rotation between the rotational speed Nmg of the rotating electric machine 33 and the post-shifting synchronous rotational speed Nsyna. The rotational speed Nmg of the rotating electric machine 33 may be changed, for example, such that the differential rotation between the rotational speed Nmg of the rotating electric machine 33 and the post-shifting synchronous rotational speed Nsyna gradually becomes smaller.

(4) In the example used to describe the embodiment, the third rotational change control causes the rotational speed Nmg of the rotating electric machine 33 to change at a constant time rate of change. However, without being limited to such a structure, for example, the third rotational change control may slightly change the change rate (the rotational acceleration) of the rotational speed Nmg of the rotating electric machine 33. The change rate (the rotational acceleration) of the rotational speed Nmg of the rotating electric machine 33 may become smaller, for example, as the rotational speed Nmg of the rotating electric machine 33 approaches the second synchronous range.

(5) In the example used to describe the embodiment, the first synchronous range is set to a rotational speed range (from (Neg−ΔN2) to (Neg+ΔN2)) that has upper and lower limits each defined by the second determination differential rotational speed ΔN2 with reference to the rotational speed Neg of the internal combustion engine EG. However, without being limited to such a structure, for example, at the time of upshift shifting, the first synchronous range may be set to a rotational speed range (Neg to (Neg+ΔN2)) from the rotational speed Neg of the internal combustion engine EG to a rotational speed higher than the rotational speed Neg of the internal combustion engine EG by the second determination differential rotational speed ΔN2 inclusive. On the other hand, for example, at the time of downshift shifting, the first synchronous range may be set to a rotational speed range ((Neg−ΔN2) to Neg) from a rotational speed lower than the rotational speed Neg of the internal combustion engine EG by the second determination differential rotational speed ΔN2 to the rotational speed Neg of the internal combustion engine EG inclusive. The same goes for the second synchronous range.

(6) In the example used to describe the embodiment, after the rotational speed Nmg of the rotating electric machine 33 reaches the first synchronous range through the performance of the first rotational change control, the second rotational change control is first performed, and then the third rotational change control is performed. However, without being limited to such a structure, for example, a transition may be made from the first rotational change control directly to the third rotational change control without the second rotational change control being performed. In this case, the rotational speed Nmg of the rotating electric machine 33 may change at a constant time rate of change continuously after the rotational speed Nmg of the rotating electric machine 33 changes from the pre-shifting synchronous rotational speed Nsynb in association with the progress of the shifting operation until reaching not only the first synchronous range but also the second synchronous range.

Figure 8:
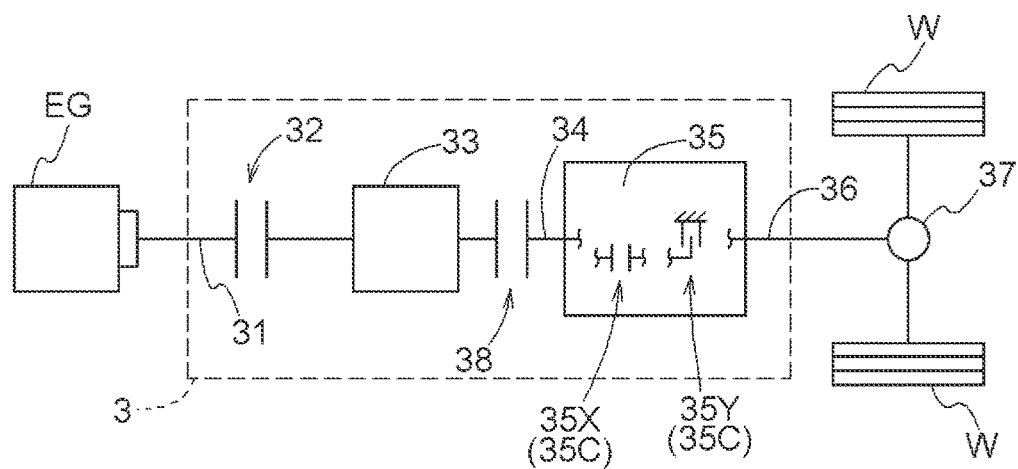
FIG. 8 is a schematic diagram of a vehicle drive system according to another embodiment.
Figure 9:
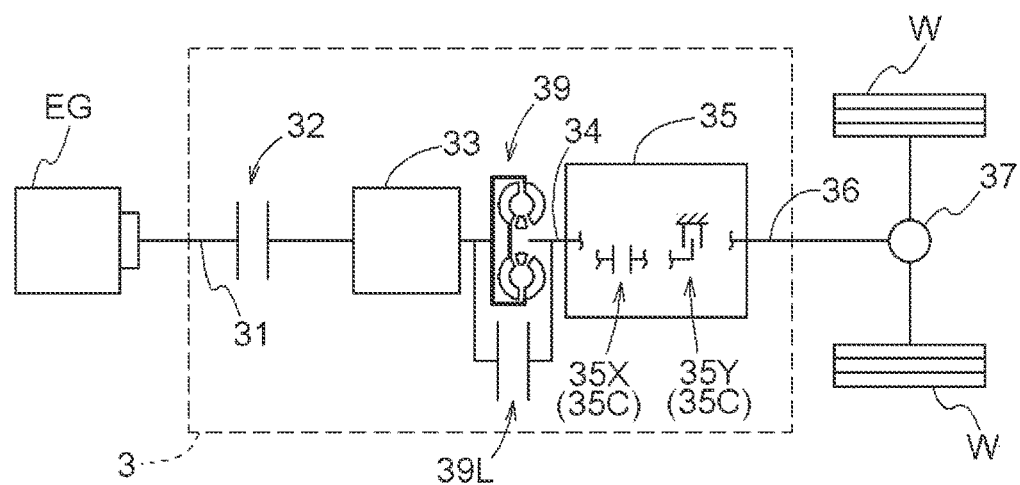
FIG. 9 is a schematic diagram of a vehicle drive system according to another embodiment.

(7) In the example used to describe the embodiment, the vehicle drive system 3 to be controlled includes the decoupling engagement device 32, the rotating electric machine 33, and the transmission 35 that are provided in the power transfer path connecting the internal combustion engine EG to the wheels W. However, without being limited to such a structure, for example, as illustrated in FIG. 8, the vehicle drive system 3 to be controlled may include a second decoupling engagement device 38 that is provided in the power transfer path between the rotating electric machine 33 and the transmission 35. Alternatively, for example, as illustrated in FIG. 9, a fluid joint 39 (a torque converter, a fluid coupling, etc.) having an engagement device 39L for direct coupling may be provided in the power transfer path between the rotating electric machine 33 and the transmission 35.

(8) In the example used to describe the embodiment, the transmission 35 of the vehicle drive system 3 to be controlled is a multi-stage automatic transmission including the planetary gear mechanism and the multiple shifting engagement devices 35C. However, without being limited to such a structure, the transmission 35 of the vehicle drive system 3 to be controlled may be another type of multi-stage automatic transmission, such as a dual clutch transmission (DCT).

It is noted that, as long as there is no inconsistency, the structures disclosed in any one of the embodiments described above (including the foregoing embodiment and the other embodiments) may be used in combination with the structures disclosed in any other of the embodiments.

In addition, for other structures, the embodiments disclosed in the present specification should be considered in all aspect as illustrative. Therefore, various modifications that fall within the spirit of the present disclosure will be apparent to those skilled in the art.

(Summary of the Embodiments)

To summarize the above, the control device according to the present disclosure preferably includes the following structures.

[1]

A control device (1) is for controlling a vehicle drive system (3) in which an engagement device (32), a rotating electric machine (33), and a multi-stage automatic transmission (35) are provided in a power transfer path connecting an internal combustion engine (EG) to wheels (W), wherein when engaging the engagement device (32) to start the internal combustion engine (EG) during a shifting operation of the multi-stage automatic transmission (35) under a condition where a vehicle travels on a torque of the rotating electric machine (33) with the engagement device (32) in a disengagement state, the control device (1) causes a rotational speed (Nmg) of the rotating electric machine (33) to change according to a predetermined first change pattern after the rotational speed (Nmg) of the rotating electric machine (33) changes from a pre-shifting synchronous rotational speed (Nsynb) in association with progress of the shifting operation until reaching a first synchronous range that is determined on the basis of a rotational speed (Neg) of the internal combustion engine (EG), where the pre-shifting synchronous rotational speed (Nsynb) is the rotational speed (Nmg) of the rotating electric machine (33) in a shift speed established before the shifting operation is started.

According to this structure, when the shifting operation coincides with start control of the internal combustion engine, rotational speed control of the rotating electric machine is performed according to the first change pattern after the rotational speed of the rotating electric machine changes from the pre-shifting synchronous rotational speed until reaching the first synchronous range of the rotational speed of the internal combustion engine. If there arises a difference between an actual value and a target value of the transfer torque capacity of the engagement device, the rotational speed control of the rotating electric machine corrects the output torque of the rotating electric machine in accordance with the difference, thereby maintaining the rotational acceleration of an input member (hereinafter referred to as "shifting input member") of the multi-stage automatic transmission stable. Thus, good drivability is maintained.

[2]

The rotational speed (Nmg) of the rotating electric machine (33) in the shift speed established after the shifting operation is completed is defined as a post-shifting synchronous rotational speed (Nsyna), and after the rotational speed (Nmg) of the rotating electric machine (33) reaches the first synchronous range until the engagement device (32) reaches a direct engagement state, the rotational speed (Nmg) of the rotating electric machine (33) is caused to change according to a second change pattern that is set to have differential rotation (ΔNs) relative to the post-shifting synchronous rotational speed (Nsyna).

According to this structure, torque fluctuations caused when the engagement device reaches the direct engagement state are not transferred to the wheels, and consequently, shock associated with bringing the engagement device into direct engagement is avoided. Thus, also from this point of view, good drivability is maintained.

[3]

The first change pattern is a pattern that changes at a constant rate of change from the pre-shifting synchronous rotational speed (Nsynb) until the first synchronous range, the second change pattern is a pattern that is set to maintain the differential rotation (ΔNs) relative to the post-shifting synchronous rotational speed (Nsyna) within a constant range, and after the engagement device (32) reaches the direct engagement state until the rotational speed (Nmg) of the rotating electric machine (33) reaches a second synchronous range that is determined on the basis of the post-shifting synchronous rotational speed (Nsyna), the rotational speed (Nmg) of the rotating electric machine (33) is caused to change according to a third change pattern that changes at a constant rate of change toward the post-shifting synchronous rotational speed (Nsyna).

According to this structure, the rotational acceleration of the shifting input member is maintained constant after the rotational speed of the rotating electric machine changes from the pre-shifting synchronous rotational speed until reaching the first synchronous range. Further, the rotational acceleration of the shifting input member is also maintained constant after the engagement device reaches the direct engagement state until the rotational speed of the rotating electric machine reaches the second synchronous range. Thus, drivability is maintained better. Moreover, when the shifting operation coincides with the start control of the internal combustion engine, the effects described above are achievable over almost the whole period of the shifting operation.

It is only necessary that the control device according to the present disclosure should achieve at least one of the effects described above.

INDUSTRIAL APPLICABILITY

The technique according to the present disclosure is applicable to, for example, a control device for controlling a vehicle drive system used in hybrid vehicles.

The invention claimed is:

1. A control device for controlling a vehicle drive system in which an engagement device, a rotating electric machine, and a multi-stage automatic transmission are provided in a power transfer path connecting an internal combustion engine to wheels, the control device comprising:

an electronic control unit that is configured to, when engaging the engagement device to start the internal combustion engine during a shifting operation of the multi-stage automatic transmission under a condition where a vehicle travels on a torque of the rotating electric machine with the engagement device in a disengagement state, cause a rotational speed of the rotating electric machine to change according to a predetermined first change pattern after the rotational speed of the rotating electric machine changes from a pre-shifting synchronous rotational speed in association with progress of the shifting operation until reaching a first synchronous range that is determined on the basis of a rotational speed of the internal combustion engine, the pre-shifting synchronous rotational speed being the rotational speed of the rotating electric machine in a shift speed established before the shifting operation is started, wherein the rotational speed of the rotating electric machine in the shift speed established after the shifting operation is completed is defined as a post-shifting synchronous rotational speed, and after the rotational speed of the rotating electric machine reaches the first synchronous range until an engagement command pressure for the engagement device becomes equal to a direct engagement pressure, the electronic control unit causes the rotational speeds of the internal combustion engine and the rotating electric machine to change according to a second change pattern that is set to have differential rotation relative to the post-shifting synchronous rotational speed.

2. The control device according to claim 1, wherein the first change pattern is a pattern that changes at a constant rate of change from the pre-shifting synchronous rotational speed until the first synchronous range, the second change pattern is a pattern that is set to maintain the differential rotation relative to the post-shifting synchronous rotational speed within a constant range, and after the engagement device reaches the direct engagement state until the rotational speed of the rotating electric machine reaches a second synchronous range that is determined on the basis of the post-shifting synchronous rotational speed, the electronic control unit causes the rotational speed of the rotating electric machine to change according to a third change pattern that changes at a constant rate of change toward the post-shifting synchronous rotational speed.

* * * * *